United States Patent
Murasame et al.

(10) Patent No.: US 12,047,861 B2
(45) Date of Patent: Jul. 23, 2024

(54) COMMUNICATION SYSTEM, COMMUNICATION METHOD, AND SERVER

(71) Applicant: NEC Corporation, Tokyo (JP)

(72) Inventors: Azusa Murasame, Tokyo (JP); Satoru Shimura, Tokyo (JP)

(73) Assignee: NEC CORPORATION, Tokyo (JP)

(*) Notice: Subject to any disclaimer, the term of this patent is extended or adjusted under 35 U.S.C. 154(b) by 454 days.

(21) Appl. No.: 17/610,226

(22) PCT Filed: Mar. 10, 2020

(86) PCT No.: PCT/JP2020/010247
§ 371 (c)(1),
(2) Date: Nov. 10, 2021

(87) PCT Pub. No.: WO2020/235182
PCT Pub. Date: Nov. 26, 2020

(65) Prior Publication Data
US 2022/0248299 A1    Aug. 4, 2022

(30) Foreign Application Priority Data

May 21, 2019  (JP) .................................. 2019-095048

(51) Int. Cl.
H04W 40/12    (2009.01)
H04W 40/18    (2009.01)

(52) U.S. Cl.
CPC ........... *H04W 40/12* (2013.01); *H04W 40/18* (2013.01)

(58) Field of Classification Search
None
See application file for complete search history.

(56) References Cited

U.S. PATENT DOCUMENTS 10,103,977 B2 * 10/2018 Bi .......................... H04L 41/342
10,417,102 B2 *  9/2019 Sanakkayala ......... G06F 11/203
(Continued)

FOREIGN PATENT DOCUMENTS

JP    2015-005915 A    1/2015
WO    2014/128755 A1   8/2014
(Continued)

OTHER PUBLICATIONS

International Search Report for PCT Application No. PCT/JP2020/010247, mailed on May 26, 2020.
(Continued)

*Primary Examiner* — Faiyazkhan Ghafoerkhan
(74) *Attorney, Agent, or Firm* — Sughrue Mion, PLLC (57) ABSTRACT

A communication system includes gateways and a network server. Each gateway includes a data transmission/reception unit that transmits data to a base station, a connectivity confirmation unit that transmits a result of confirming connectivity with another gateway to the network server, a data transfer unit that transfers data to an unspecified gateway when a communication failure occurs, and a hopping communication unit that processes transfer data based on a hopping rule. The network server includes a data reception unit, a connectivity confirmation result reception unit, and a hopping rule distribution unit that generates and distributes the hopping rule based on a criterion for giving a priority to a transfer from the gateway camping on a different base station.

10 Claims, 10 Drawing Sheets

(56) References Cited

U.S. PATENT DOCUMENTS

| | | | |
|---|---|---|---|
| 10,474,548 B2* | 11/2019 | Sanakkayala | G06F 11/203 |
| 10,747,630 B2* | 8/2020 | Sanakkayala | G06F 11/3006 |
| 10,896,104 B2* | 1/2021 | Sanakkayala | G06F 11/3006 |
| 11,429,499 B2* | 8/2022 | Sanakkayala | G06F 11/1438 |
| 2002/0069261 A1* | 6/2002 | Bellare | G06F 16/958 |
| | | | 707/E17.116 |
| 2003/0110126 A1* | 6/2003 | Dunkeld | G06Q 20/10 |
| | | | 705/39 |
| 2004/0133666 A1* | 7/2004 | Marce | G06F 9/5083 |
| | | | 709/222 |
| 2004/0181752 A1* | 9/2004 | Kinno | H04N 21/25808 |
| | | | 715/239 |
| 2005/0005006 A1* | 1/2005 | Chauffour | H04L 67/1029 |
| | | | 709/223 |
| 2006/0023741 A1* | 2/2006 | Charzinski | H04L 41/0894 |
| | | | 370/252 |
| 2007/0140536 A1* | 6/2007 | Sehnert | G16H 30/20 |
| | | | 382/128 |
| 2015/0271252 A1* | 9/2015 | Sato | G06F 9/50 |
| | | | 709/201 |
| 2016/0294682 A1* | 10/2016 | Bi | H04L 45/64 |
| 2016/0314175 A1* | 10/2016 | Dhayapule | H04L 67/1001 |
| 2017/0163329 A1* | 6/2017 | Dangy-Caye | H04L 12/66 |
| 2017/0302705 A1* | 10/2017 | Krywaniuk | H04L 63/0281 |
| 2018/0035282 A1* | 2/2018 | Kaliner | H04W 4/24 |
| 2018/0095855 A1* | 4/2018 | Sanakkayala | G06F 11/203 |
| 2018/0262818 A1* | 9/2018 | Rao | H04N 7/173 |
| 2018/0287869 A1* | 10/2018 | Munafo | H04W 12/069 |
| 2019/0057419 A1* | 2/2019 | Jacobs | H04L 51/52 |
| 2019/0079981 A1* | 3/2019 | Dhayapule | H04L 47/125 |
| 2019/0340088 A1* | 11/2019 | Sanakkayala | G06F 11/1438 |
| 2021/0366000 A1* | 11/2021 | Jacobs | G06Q 30/0643 |
| 2021/0366001 A1* | 11/2021 | Jacobs | G06F 3/04845 |
| 2022/0248299 A1* | 8/2022 | Murasame | H04W 24/04 |

FOREIGN PATENT DOCUMENTS

| | | |
|---|---|---|
| WO | 2018/087835 A1 | 5/2018 |
| WO | 2018/183789 A1 | 10/2018 |

OTHER PUBLICATIONS

Extended European Search Report for EP Application No. EP20810026.3 dated on Jun. 10, 2022.

* cited by examiner

| GWID | PROCESSING |
|---|---|
| GW-A | TRANSFER DEVICE DATA |
| GW-B | DISCARD DEVICE DATA |
| GW-C | TRANSMIT DEVICE DATA TO NETWORK SERVER VIA BASE STATION GATEWAY CAMPS ON |

| TRANSMISSION SOURCE GW | TRANSFER DESTINATION GW | PROCESSING RULE |
|---|---|---|
| GW-A | GW-D | ACCEPT |
| GW-A | GW-B | DISCARD |
| GW-A | GW-C | DISCARD |
| GW-A | GW-E | DISCARD |

Fig. 10

COMMUNICATION SYSTEM, COMMUNICATION METHOD, AND SERVER

This application is a National Stage Entry of PCT/JP2020/010247 filed on Mar. 10, 2020, which claims priority from Japanese Patent Application 2019-095048 filed on May 21, 2019, the contents of all of which are incorporated herein by reference, in their entirety.

TECHNICAL FIELD

The present disclosure relates to a communication system, a communication method, and a server, and to a hopping communication technique.

BACKGROUND ART

IoT (Internet of things) networks using sensor devices for measuring temperature and humidity, etc. are required to consume little power and be capable of long-distance transmission. Sensing IoT requires a communication technology different from that of 3G/LTE.

For example, the LoRaWAN (Long Range Wide Area Network) is one of networks for IoT and is an unlicensed band that does not require a license.

LoRaWAN is a relatively new network, and some specifications of LoRaWAN not defined.

Figure 1:
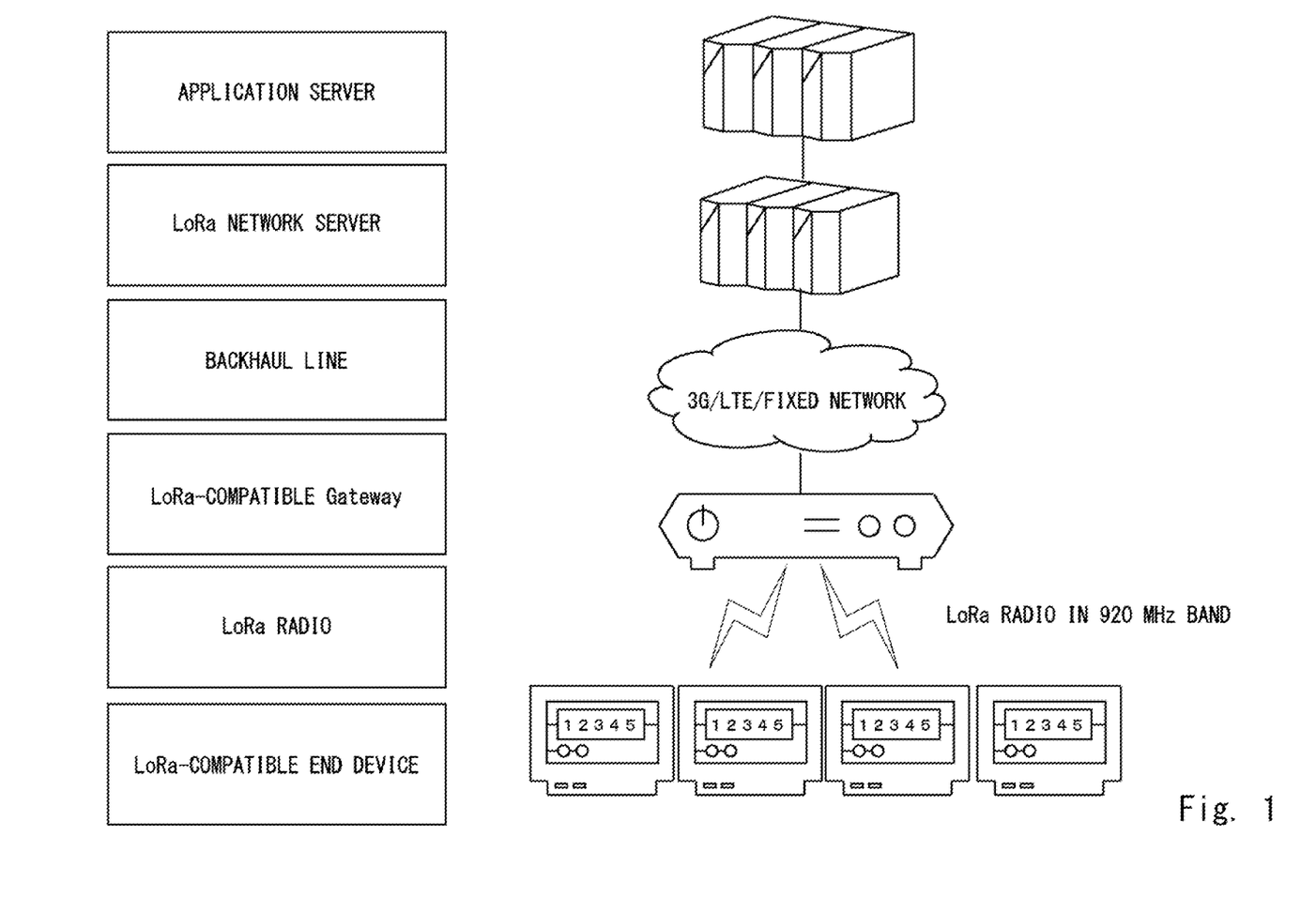
FIG. 1 is a configuration diagram showing a configuration of LoRaWAN.

FIG. 1 is a configuration diagram showing a network architecture of LoRaWAN. The LoRaWAN network is composed of LoRa devices, LoRa gateways, LoRa network servers, and application servers.

The LoRa device transmits data to a LoRa gateway using the LoRa radio modulation method. The LoRa gateway converts the protocol from the LoRa wireless modulation method to TCP/IP and transmits data to the LoRa network server. The LoRa network server transmits the data to an appropriate application server.

In the LoRaWAN, the communication at a level higher than the LoRa gateway uses a backhaul line such as 3G or LTE. Therefore, when congestion or a failure occurs in a base station, there is a problem that the LoRa device cannot communicate with the application server. In order to address this issue, it is necessary to prepare a mechanism that enables continuous collection of data from the LoRa devices even if the backhaul line using a carrier network such as 3G/LTE becomes unavailable.

Patent Literature 1 discloses a technique in which a radio communication terminal camping outside the base station transmits rescue information to a predetermined report destination via another radio communication terminal. By distributing a reporting completed list, the radio communication terminals can end the report.

CITATION LIST

Patent Literature

Patent Literature 1: Japanese Unexamined Patent Application Publication No. 2015-005915

SUMMARY OF INVENTION

Technical Problem

As described above, when a failure occurs in the backhaul line, there is a problem that the device cannot communicate with the application server.

One of the solutions to this is to perform multi-hop communication by wireless communication. Here, for example, in LoRaWAN, since peer-to-peer communication like Wi-Fi is not defined, broadcast communication is performed instead of unicast communication. In such a case, since the gateway transmits data to all the gateways within the range where radio waves can reach, there may be congestion in the communication.

The possibility of causing congestion in the communication is significantly high, because LoRaWAN is a network capable of long-distance transmission.

It is said that LoRa communication of LPWA (LoW Power Wide Area) can receive radio waves from a distance of 10 km or more in an environment with good visibility. Therefore, the number of gateways in the range where radio waves of LoRa communication can reach from a certain gateway is much larger than that of existing networks, compared with those in which radio waves can reach from a short distance. This greatly increases the risk of causing congestion in the communication while communicating in multi-hop. Congestion, which requires little attention when existing wireless multi-hop communication is used, is a very important issue in LoRa, where radio waves travel over long distances.

In the method disclosed in Patent Literature 1, since it takes a certain time to prepare and distribute the reporting completed list, it is impossible to prevent congestion during this time. Further, the method described in Patent Literature 1 cannot handle the case where data is continuously transmitted by a sensor device.

The present disclosure has been made to solve the above problems and an object of the present disclosure is to provide a communication system, a communication method, and a server capable of hopping communication without causing congestion.

Solution to Problem

A communication system according to the present disclosure includes: a plurality of gateways configured to receive device data transmitted from devices and transmit the device data to a network server via a network; and the network server configured to receive the device data transmitted from the gateways via the network. Each of the gateways includes: connectivity confirmation means for confirming connectivity with another gateway and transmitting a connectivity confirmation result to the network server; data transfer means for transferring the device data to an unspecified gateway as transfer data when a failure occurs in communication with a base station the corresponding gateway camps on; and hopping communication means for executing processing on the transfer data transferred from another gateway based on a hopping rule. The network server includes: connectivity confirmation result reception means for receiving the connectivity confirmation results from the gateways; and hopping rule distribution means for generating the hopping rule from the connectivity confirmation results based on a criterion for giving a priority to a transfer from the gateway camping on a base station different from the base station on which the corresponding gateway camps and then distributing the generated hoping rule to the gateways.

A method of communication between gateways and a network server via a network according to the present disclosure includes: performing, by each gateway, connectivity confirmation with another gateway and transmitting a connectivity confirmation result to the network server; generating, by the network server, hopping rule for defining processing on transfer data in the gateways from the connectivity confirmation results based on a criterion for giving a priority to communication from the gateway camping on a base station different from a base station the corresponding gateway camps on and then distributing the hopping rule to the gateways; transferring, by each gateway, device data received from a device to an unspecified gateway as the transfer data when a failure occurs in communication with the base station the corresponding gateway camps on; and performing, by each gateway, processing on the transfer data transmitted from another gateway in accordance with the hopping rule.

A server according to the present disclosure for generating hopping rule for a plurality of gateways receiving device data transmitted from devices and transmitting the device data to a network server via a network, the server includes: connectivity confirmation result reception means for receiving, from each gateway, a result of confirming connectivity with another gateway; and hopping rule distribution means for generating the hopping rule from the connectivity confirmation results based on a criterion for giving a priority to a transfer from the gateway camping on a base station different from a base station the corresponding gateway camps on and distributing the generated hopping rule to the gateways.

Advantageous Effects of Invention

According to the present disclosure, it is possible to provide a communication system, a communication method, and a server capable of hopping communication without causing congestion.

EXAMPLE EMBODIMENTS

First Example Embodiment

Figure 2:
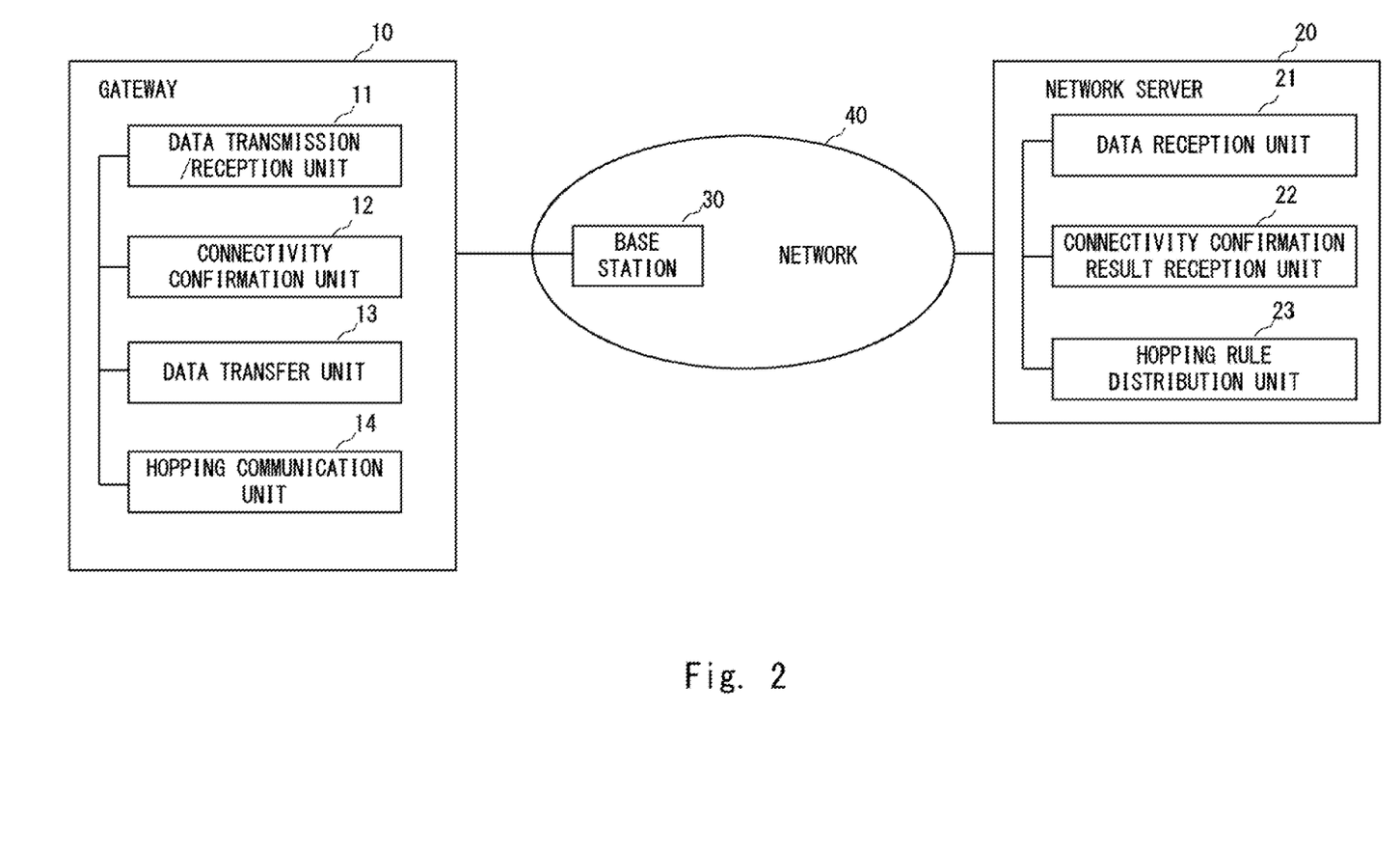
FIG. 2 is a configuration diagram showing a configuration of a wireless communication system according to an example embodiment for implementing a first disclosure.

FIG. 2 is a configuration diagram showing a communication system 100 according to a first example embodiment.

The communication system 100 includes gateways 10 and a network server 20. The gateway 10 and the network server 20 are connected via a network 40.

The gateway 10 includes a data transmission/reception unit 11, a connectivity confirmation unit 12, a data transfer unit 13, and a hopping communication unit 14.

The data transmission/reception unit 11 receives data transmitted by devices and transmits the data to the network server 20 via the network 40. In this case, the data transmission/reception unit 11 performs protocol conversion on the data and transmits the data to a base station 30.

The connectivity confirmation unit 12 confirms connectivity with another gateway and transmits a connectivity confirmation result to the network server 20. The connectivity confirmation result includes information about a transmission source gateway and a transmission destination gateway.

The data transfer unit 13 transfers the data received from the device to another gateway 10 as transfer data. The data transfer unit 13 transfers the data when a failure occurs in communication with the base station 30.

The hopping communication unit 14 transfers or discards the transfer data received from another gateway 10 to another gateway 10 based on a hopping rule or transmits the data to the network server 20 via the base station 30.

The network server 20 includes a data reception unit 21, a connectivity confirmation result reception unit 22, and a hopping rule distribution unit 23.

The data reception unit 21 receives the data transmitted by the gateway 10.

The connectivity confirmation result reception unit 22 receives the connectivity confirmation results.

The hopping rule distribution unit 23 creates a hopping rule based on the connectivity confirmation result. The hopping rule distribution unit 23 generates the hopping rule based on a criterion that a priority is given to communication from a gateway present with the range of a base station different from a base station the gateway camps on. The hopping rule distribution unit 23 distributes the hopping rule to the gateways 10.

In this case, the data transferred from the gateway within the range of the base station same as the base station on which the gateway camps is discarded based on the hopping rule and is not transferred again. Thus, data can be transferred without causing data congestion.

Second Example Embodiment

A communication system according to this example embodiment includes gateways 10 and a network server 20. A configuration diagram of the communication system is the same as that of FIG. 2.

A LoRa device transmits device data to the network server 20 via the gateway 10. The LoRa device communicates with the gateway 10 by LoRa radio.

The LoRa device describes a hopping number in an unused area of a header of the device data. The hopping number is a predetermined value set by the network server 20.

The gateway 10 includes a data transmission/reception unit 11, a connectivity confirmation unit 12, a data transfer unit 13, and a hopping communication unit 14.

The data transmission/reception unit 11 receives device data from the LoRa device. The data transmission/reception unit 11 transmits the device data to the network server 20 via a base station on which the gateway 10 camps.

The connectivity confirmation unit 12 periodically transmits connectivity confirmation data to gateways 10 other than the corresponding gateway 10, which may be hereinafter referred to as other gateways 10, by LoRa radio. The connectivity confirmation unit 12 receives the connectivity confirmation data transmitted by other gateways 10 and transmits the data to the network server 20.

The data transfer unit 13 transfers the device data to other gateways 10 when the backhaul line becomes unavailable due to a failure or the like.

The hopping communication unit 14 manages the hopping rule as a hopping database. The hopping rule defines processing for the data received from other gateways 10.

Figure 3:
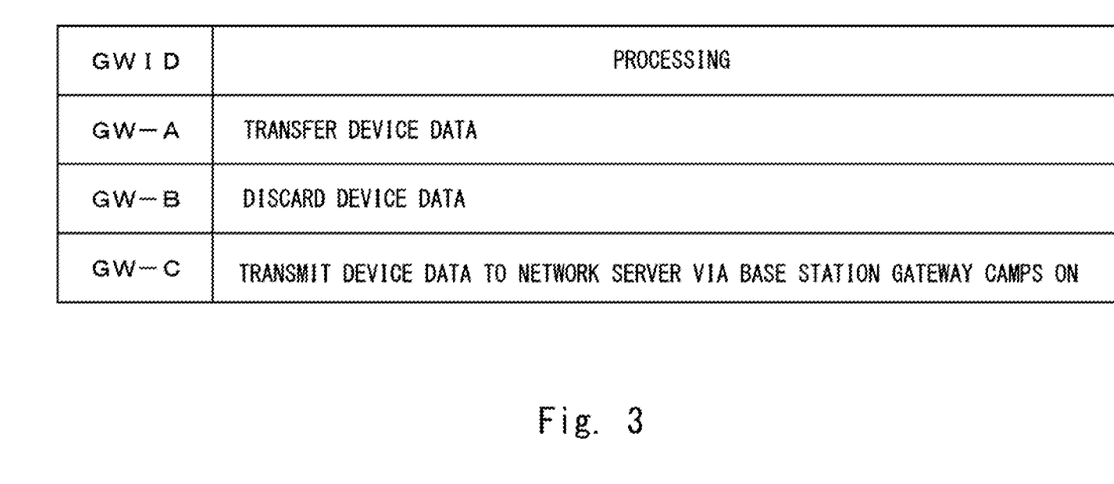
FIG. 3 shows an example of a hopping database according to an example embodiment for implementing a second disclosure.

FIG. 3 shows an example of the hopping database. Each record is composed of a GWID for identifying a transmission source gateway and processing for the device data transmitted from the gateway 10 corresponding to the GWID.

The hopping communication unit 14 refers to the hopping database and the hopping number included in the header for the device data transferred from other gateways 10, and performs processing to transfer, discard or transmit the device data to the network server 20 through the backhaul line.

Figure 4:
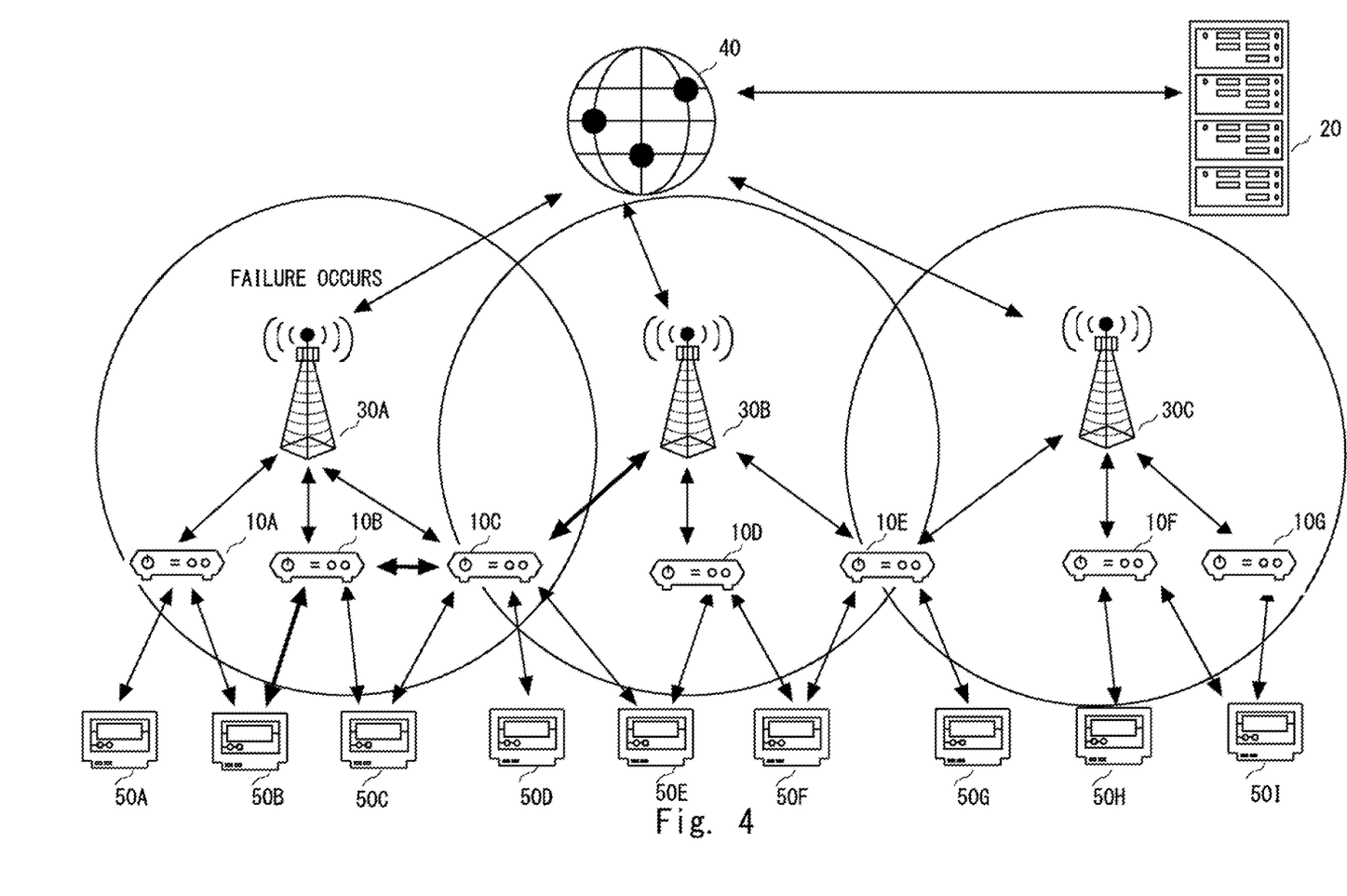
FIG. 4 shows an outline of an example of hopping communication according to the example embodiment for implementing the second disclosure.

FIG. 4 shows an example of communication by hopping. When a failure occurs in a base station A, a gateway 10B transfers data from a LoRa device 50B to a gateway 10C. The gateway 10C transmits the data to the network server 20 via the base station 30B in accordance with a hopping rule. Other gateways discard the data in accordance with the hopping rule.

The hopping communication unit 14 transfers the received device data only when the hopping number is other than 0. The hopping communication unit 14 performs processing for reducing the hopping number included in the header by one when transferring the device data. The hopping communication unit 14 discards the device data when the hopping number is 0. By setting the hopping number and performing the above operation, it is possible to limit the number of transfer of the device data to a predetermined value and prevent the repetition of the retransfer. For example, by setting the hopping number to 1, the transfer of the device data can be limited to a maximum of one stage.

The network server 20 includes a data reception unit 21, a connectivity confirmation result reception unit 22, and a hopping rule distribution unit 23.

The data reception unit 21 receives the device data transmitted by each LoRa device 50. The data reception unit 21 transmits the received data to a higher level application server according to the obtained device data.

The connectivity confirmation result reception unit 22 receives the connectivity confirmation result from each gateway 10 and manages it as a connectivity confirmation database.

The hopping rule distribution unit 23 refers to the connectivity confirmation database included in the connectivity confirmation result reception unit 22 to generate a hopping rule. The hopping rule distribution unit 23 distributes the generated hopping rule to each gateway 10.

The hopping rule distribution unit 23 sets any hopping number for each LoRa device 50.

Figure 5:
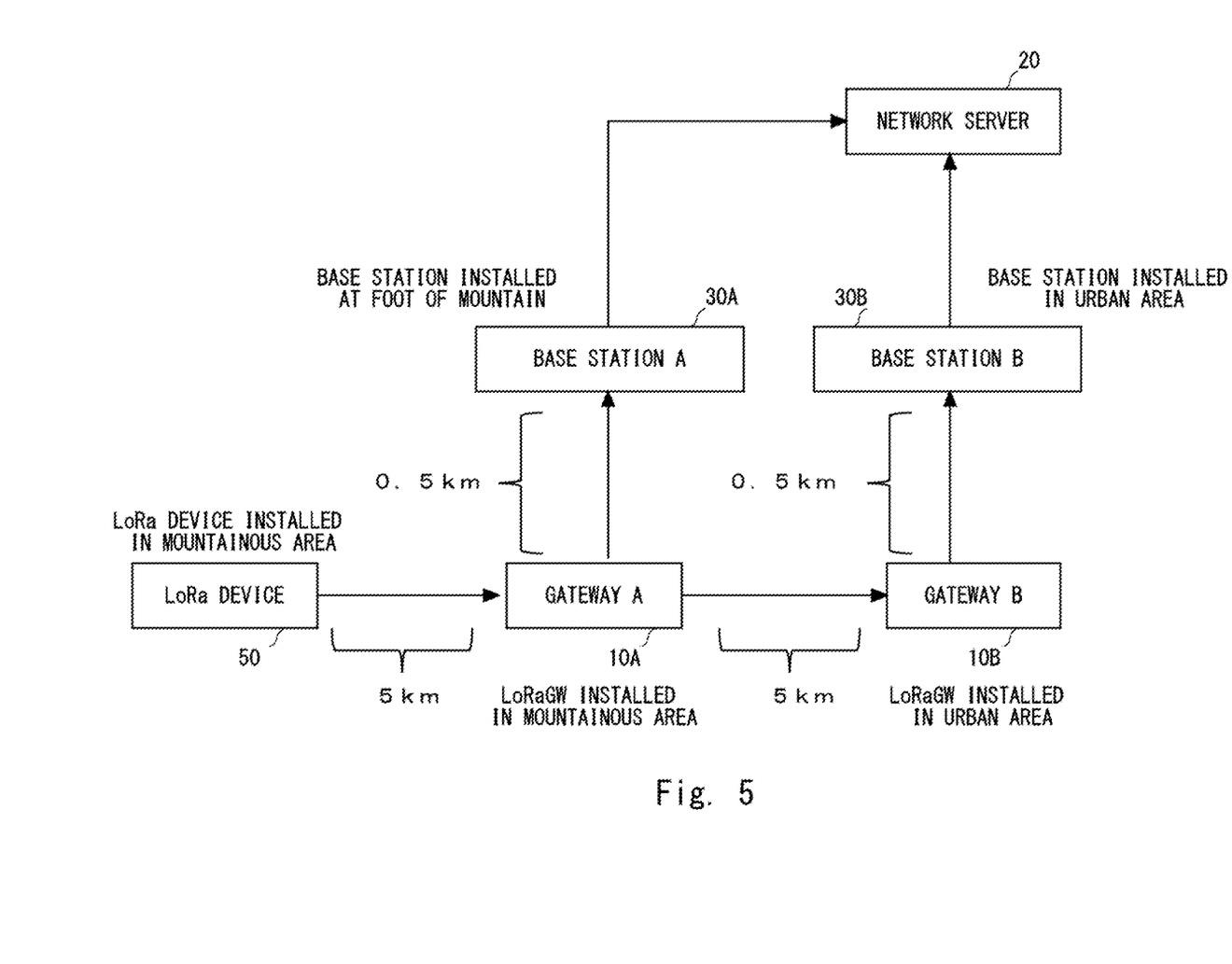
FIG. 5 is a schematic diagram showing an example arrangement of components according to the example embodiment for implementing the second disclosure.

An outline of this example embodiment will be described with reference to FIG. 5. FIG. 5 is a schematic diagram showing an arrangement example of each component.

The LoRa device 50 is installed in a mountainous area. The LoRa device 50 transmits the device data to the network server 20.

The gateway 10A is installed at a foot of a mountain, and the gateway 10B is installed in an urban area. The base station 30A is installed at a foot of the mountain, and the base station 30B is installed in the urban area. The base station 30A and the base station 30B are, for example, 3G/LTE base stations.

The distance between the gateway 10A and the base station 30A is 0.5 km, and the gateway 10A camps on the base station 30A. The distance between the gateway 10B and the base station 30B is 0.5 km, and the gateway 10B camps on the base station 30B.

The distance between the gateway 10A and the LoRa device 50 is 5 km, and the gateway 10A can receive the device data transmitted from the LoRa device 50. The distance between the gateway 10B and the LoRa device 50 is 10 km, and the gateway 10B cannot receive the device data transmitted from the LoRa device 50.

The distance between the gateway 10A and the gateway 10B is 5 km, and the gateway 10A and the gateway 10B can communicate with each other by a LoRa radio method.

When a failure occurs in the backhaul line in the base station 30A installed at the foot of the mountain, the gateway 10A becomes unable to transmit the device data to the network server 20.

In such a case, in the example embodiment of the present disclosure, the gateway 10A transfers the device data to the gateway 10B, and the gateway 10B transmits the device data to the network server 20.

FIG. 5 shows a case in which the device data reaches only one gateway 10 installed at the foot of the mountain and does not reach the gateway 10 installed in the urban area due to a problem of a positional relationship between the LoRa device 50 and the gateways 10. In such a case, it is assumed that the present disclosure is particularly effective. As a specific example, the device data may be collected in a mountainous area in order to detect a landslide in the mountainous area.

When conditions such as an antenna height, an antenna length, and a radio wave output are the same, a radio wave reaching distance of the LoRa radio method is longer than that of the 3G/LTE radio method. In urban areas, it is considered that a difference between the radio wave intensity of LoRa radio method and that of the 3G/LTE radio method is 20 dBm, and a difference between the radio wave reaching distance of the LoRa radio method and that of the 3G/LTE radio method is several hundred meters or more.

On the other hand, a cell size of a carrier network such as 3G/LTE is generally several hundred meters to several kilometers. A cell of several kilometers is referred to as a large zone and a cell of several hundred meters is referred to a small zone. The large zone applies to plains with low population density, and the small zone applies to urban areas with high population density. On the other hand, cells in mountainous areas, which are common in Japan, are often small zones due to geographical constraints. In mountainous areas, base stations are often installed halfway up a mountain. In such a case, a dead zone is generated at the top of the mountain, a ridge or a valley of the mountain.

LoRa devices for sensing temperature, vibration, and the like are installed in a mountainous area to detect a landslide in the mountain. In this case, since the location of the 3G/LTE base station is limited, it is often necessary to install the gateways 10 for collecting data from the LoRa devices at the foot of the mountain.

Figure 6:
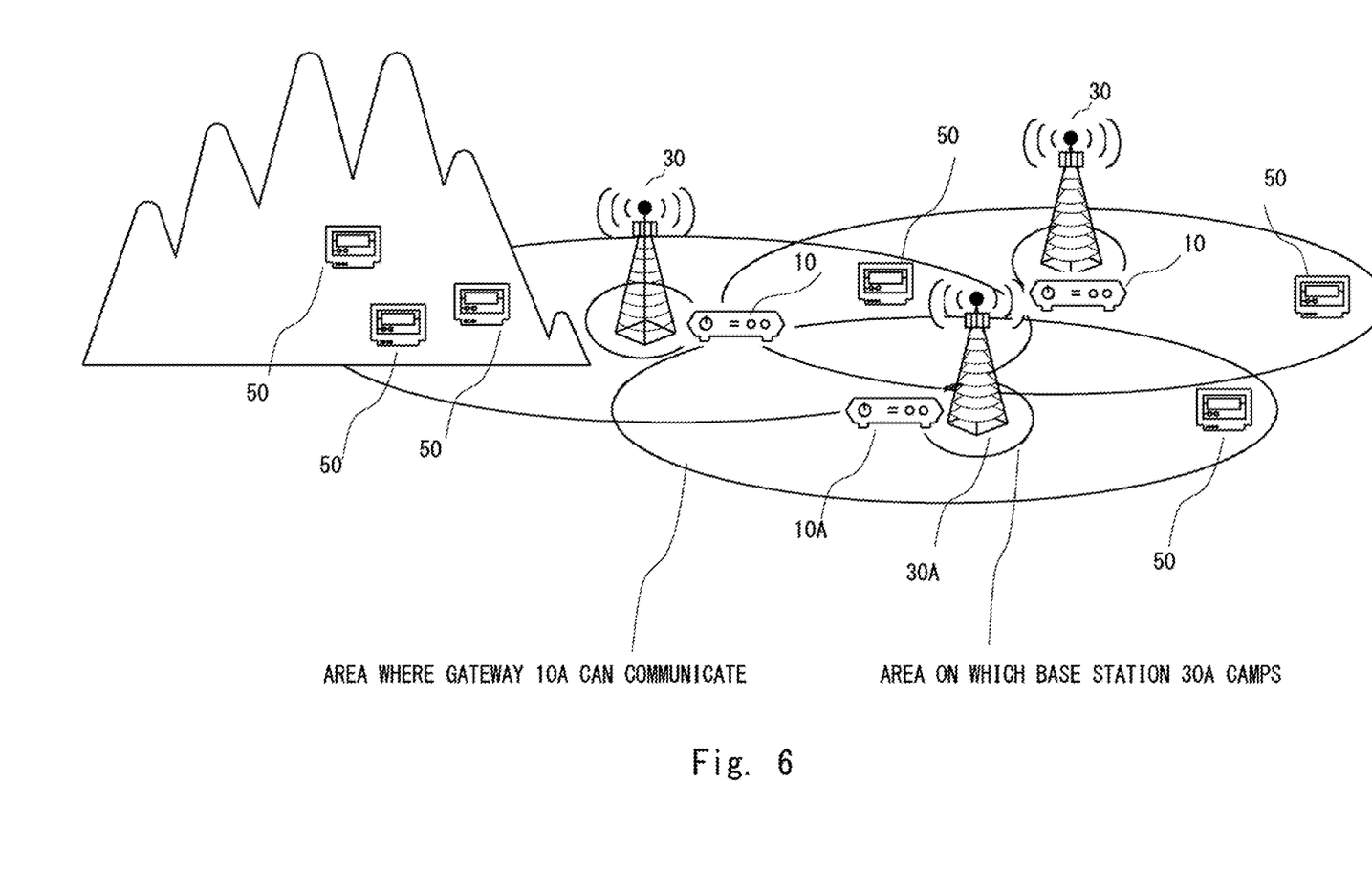
FIG. 6 is a schematic diagram showing an example of LoRa devices installed in a mountainous area according to the example embodiment for implementing the second disclosure.

FIG. 6 is a schematic diagram showing a case where the gateways 10 and the base stations 30 are installed at the foot of a mountain.

When environmental information or the like is collected in a mountainous area by utilizing the LoRa communication method, if a failure occurs in a backhaul line in a base station and communication becomes difficult, the LoRa device 50 cannot transmit the device data to the network server 20.

According to the example embodiment of the present disclosure, even if a failure occurs in the backhaul line in the base station 30 installed at the foot or halfway up the mountain, the gateway 10 camping on the base station where the failure has occurred transfers data to another gateway 10, and the device data can be transmitted to the network server 20 using the backhaul line of the base station on which the transfer destination gateway 10 camps.

A procedure for transmitting the device data to the network server 20 by hopping in the event of a failure in the backhaul line will be described with reference to FIG. 7.

Figure 8:
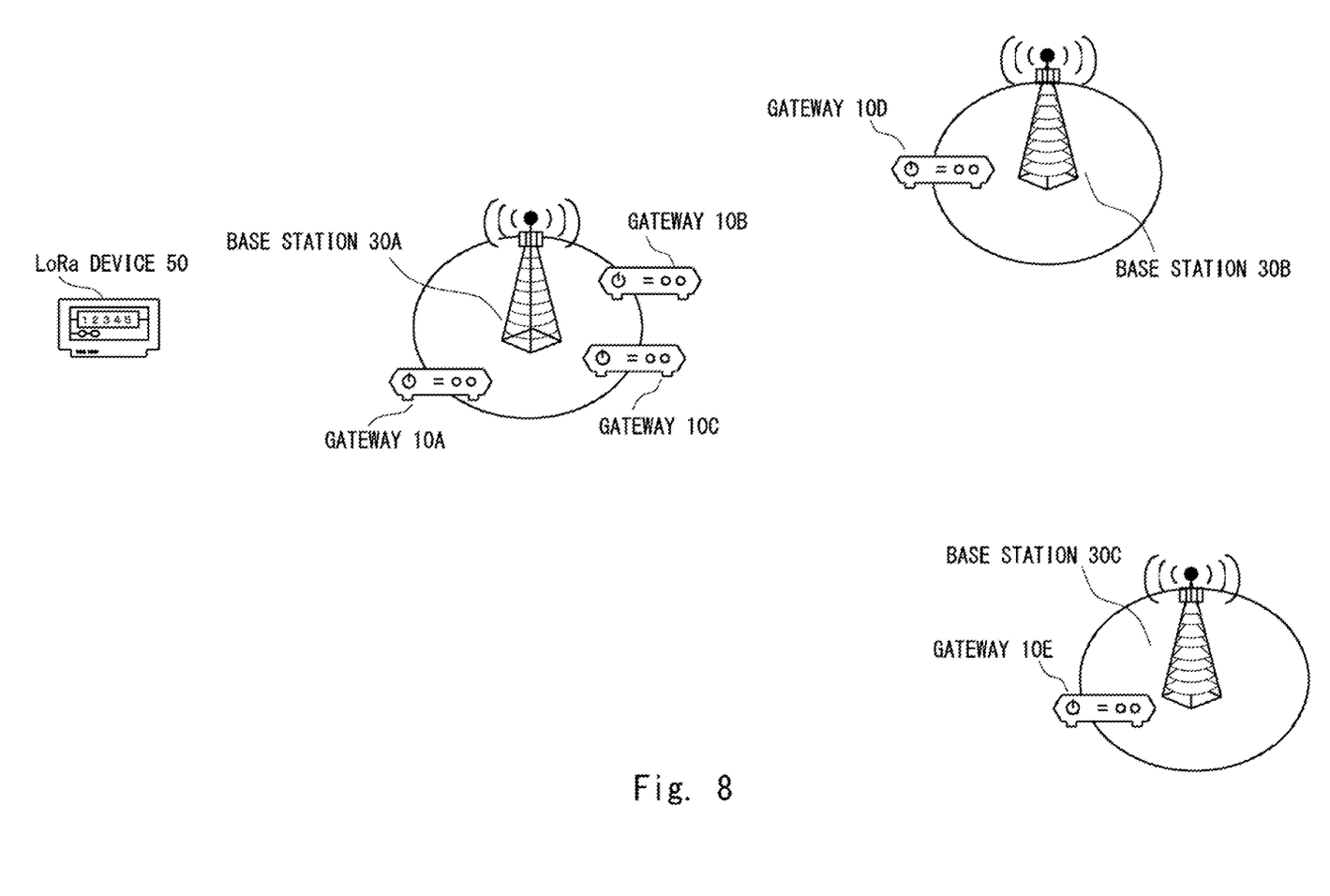
FIG. 8 is a schematic diagram showing an example of a communication system according to the example embodiment for implementing the second disclosure.

FIG. 8 schematically shows an arrangement example of each component.

A gateway 10A, a gateway 10B, and a gateway 10C camp on a base station 30A. A gateway 10D camps on a base station 30B. A gateway 10E camps on a base station 30C.

It may be assumed that the base station 30A is present at a foot of a mountain, and the base stations 30B and 30C are present in an urban area.

The distance between the LoRa device 50 and the gateway 10A is about 5 km, and LoRa communication is possible between them. The distance between the LoRa device and the gateways 10D and 10E is more than 10 km, and LoRa communication is not possible between them.

The distance between the gateway 10A and the gateway 10D is 5 km, and LoRa communication is possible between them. The distance between the gateway 10A and the gateway 10E is about 7 km, and LoRa communication is possible between them. When the gateway 10A transmits data by the LoRa communication method, the radio wave intensity received by the gateway 10D is larger than the radio wave intensity received by the gateway 10E.

During normal operations, the LoRa device 50 transmits device data to the gateway 10A. The gateway 10A transmits the device data to the network server 20 via the base station 30A.

When a failure occurs in the backhaul line of the base station 30A, the gateway 10A, which has received the device data, cannot transmit the data to the network server 20 unless hopping communication is performed.

The gateway 10B and the gateway 10C camp only on the base station 30A. Therefore, even if data is transferred from the gateway 10A to the gateways 10B and 10C, the device data cannot be transmitted to the network server 20.

The gateway 10D and the gateway 10E camp on the base stations 30B and 30C in operation, respectively. The gateway 10D and the gateway 10E can communicate with the gateway 10A. Thus, the device data can be transmitted from the gateway 10A to the network server 20 via the gateway 10D or the gateway 10E.

Because of the difference in the radio wave intensity, it is optimal for the gateway 10A to transfer the data via the gateway 10D and the base station 30B.

Figure 9:
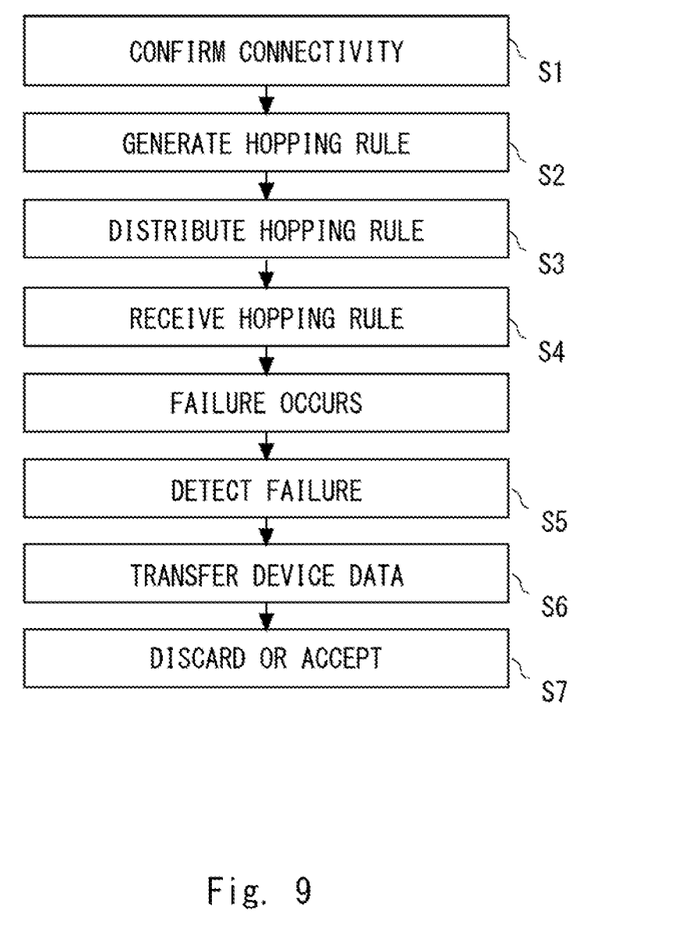
FIG. 9 is a flowchart showing an operation of the communication system according to the example embodiment for implementing the second disclosure.

An operation before a failure occurs in the backhaul line will be described with reference to FIG. 9.

Each gateway 10 transmits connectivity confirmation data including an identifier of a transmission source gateway every fixed time using a connectivity confirmation function. The gateway 10, which has received the connectivity confirmation data, transmits a set of the transmission source gateway, the transfer destination gateway, and the radio wave intensity to the network server 20 as the connectivity confirmation result (S1). Here, the transfer destination gateway is an identifier of the gateway 10 itself which has received the connectivity confirmation data.

The network server 20 generates a set of the transmission source gateway, a transfer destination gateway, and whether or not transfer is possible (accept or discard) based on the connectivity confirmation result received in (S1), and records it in the connectivity confirmation database.

The network server 20 determines whether or not transfer is possible according to the following rules (1) and (2) based on all connectivity confirmation results having the gateway 10 (gateway 10x) as a transmission source (S2).

(1) The network server 20 classifies the transfer to the gateway 10 into "discard" based on the connectivity confirmation result having the gateway 10 camping on the same base station as the base station on which the gateway 10x camps as a transfer destination. That is, no transfer is performed from the gateway 10x to the gateway 10.

(2) The network server 20 classifies the transfer to the gateway 10 having the highest radio wave intensity included in the connectivity confirmation result into "accept" for the connectivity confirmation results having the gateway 10 other than the gateway 10 classified into "discard" in (1) as the transfer destination. That is, the transfer is performed from the gateway 10x to the gateway 10. The transfer to the gateway 10 other than the gateway 10 classified as "accept" is classified as "discard".

A specific example of judging whether or not transfer is possible in the case of FIG. 7 will be described.

The gateway 10A transmits the connectivity confirmation data. The gateway 10B, the gateway 10C, the gateway 10D, and the gateway 10E receive the connectivity confirmation data.

First, since the gateway 10B and the gateway 10C camp on the same base station as the base station on which the gateway 10A camp, [transmission source: gateway 10A, transfer destination: gateway 10B, transfer: discard] and [transmission source: gateway 10A, transfer destination: gateway 10C, transfer: discard] are recorded in the connectivity confirmation database.

Next, the radio wave intensity included in the connectivity confirmation result transmitted from the remaining gateway 10D is compared with the radio wave intensity included in the connectivity confirmation result transmitted from the gateway 10E, and the gateway 10D having higher radio wave intensity is selected as a transfer destination from the gateway 10A. As a result, a set of [transmission source: gateway 10A, transfer destination: gateway 10D, transfer: accept] and [transmission source: gateway 10A, transfer destination: gateway 10E, transfer: discard] is recorded in the connectivity confirmation database.

Figure 10:
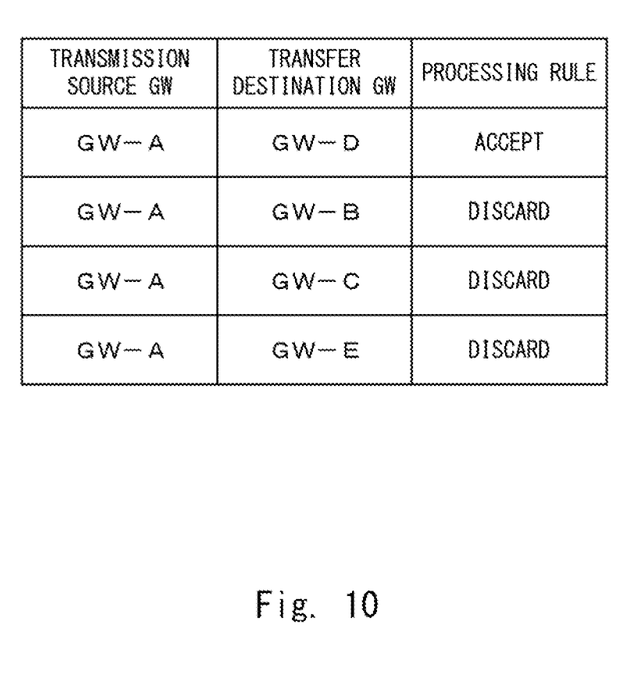
FIG. 10 shows an example of a connectivity confirmation database according to the example embodiment for implementing the second disclosure.

Consequently, the connectivity confirmation database shown in FIG. 10 is generated.

The network server distributes the hopping rule to each gateway by the hopping rule distribution unit (S3). The hopping rule distribution unit refers to a transfer destination gateway 10y for each record of the connectivity confirmation database to transmit the corresponding record to the transfer destination gateway 10y.

The gateway 10 writes the hopping rule received from the network server 20 in its own hopping database (S4).

Figure 7:
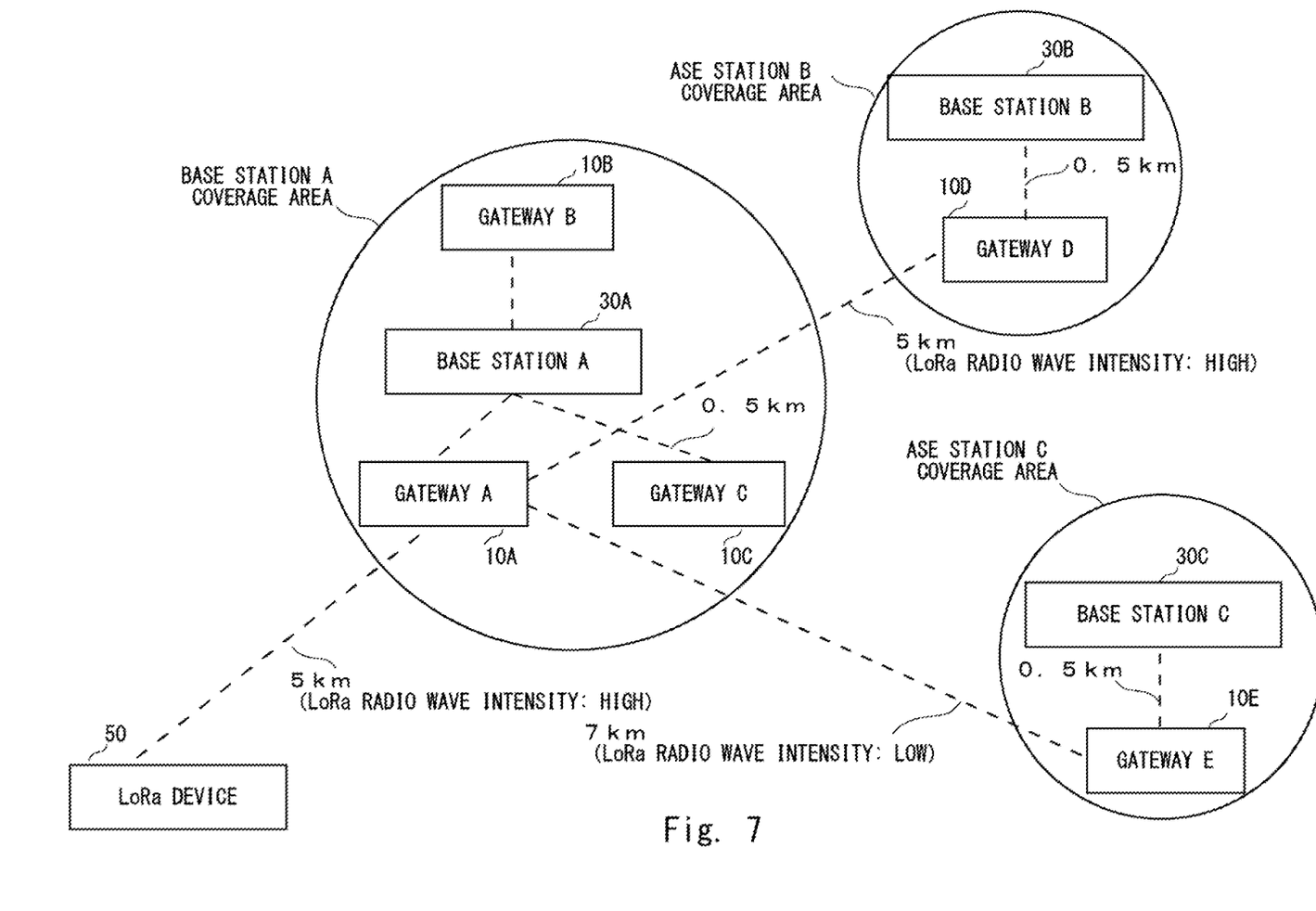
FIG. 7 shows an example arrangement of a communication system according to the example embodiment for implementing the second disclosure.

In the cases shown in FIGS. 7 and 10, a rule of "discard data transferred from the gateway 10A" is written in the hopping databases held by the gateway 10B, the gateway 10C, and the gateway 10E, and a rule of "accept data transferred from the gateway 10A" is written in the hopping database of the gateway 10D.

An operation when a failure occurs in the backhaul line will be described with reference to FIG. 9.

When a failure occurs in the backhaul line, data is transferred from the LoRa device to the network server 20 via the plurality of gateways 10 according to the following procedure.

Each gateway 10 periodically confirms connectivity with a base station on which the gateway 10 camps, and turns on its hopping mode when a failure is detected (S5). The hopping mode indicates whether or not hopping communication is performed. When the hopping mode is on, the hopping communication is performed, while when the hopping mode is off, the hopping communication is not performed.

When the gateway with its the hopping mode on receives the device data from the LoRa device 50, the gateway transfers the device data to other gateways 10 by a data transfer function (S6).

The gateway 10, which has received the device data transferred from other gateways 10, refers to the hopping rule corresponding to the transmission source gateway and the hopping number of the device data to determine whether to accept or discard the device data. The hopping rule is recorded in the hopping database held by the gateway 10 itself.

If the base station on which the gateway 10 itself camps is available when the device data is to be accepted, the received device data is transmitted to the network server 20 via the base station. On the other hand, if the base station 30 on which the gateway 10 itself camps is unavailable when the device data is to be accepted, the device data is transferred again to another gateway 10 (S7).

As a specific example, an operation when a failure occurs in the backhaul line in the base station 30A shown in FIG. 7 will be described.

The gateway 10A receives the device data transmitted by the LoRa device 50. However, it is assumed that the device data has not reached the gateways 10B, 10C, 10D, and 10E due to the positional relationship with the LoRa device.

When the hopping mode of the gateway 10A is on, the gateway 10A transfers the data received from the LoRa device to the other gateways 10 (S6). The gateways 10B, 10C, 10D, and 10E receive the transferred device data.

In the hopping rule included in the gateway 10B, the gateway 10C, and the gateway 10E, the transfer from the gateway 10A is set as "discard". Therefore, the gateway 10B, the gateway 10C, and the gateway 10E discard the received device data (S7).

In the hopping rule provided in the gateway 10D, the transfer from the gateway 10A is set as accept. When no failure is occurring in the base station 30B, the gateway 10D transmits the device data to the network server 20 via the backhaul line (S7).

In the example embodiment of the present disclosure, connectivity is confirmed among the gateways 10 in normal times, and the hopping rule is generated based on the connectivity confirmation result. The conditions for accepting or discarding data transfers between the gateways 10 are determined based on the hopping rule. When a failure occurs in the backhaul line, each gateway 10 performs data transfer in accordance with the hopping rule.

It is thus possible to continuously collect data from the LoRa device in the event of a failure in the backhaul line without causing congestion in communication due to repeated broadcasts.

In addition to the occurrence of a failure in the backhaul line, the present disclosure can also be applied when the communication traffic of SIM associated with the gateway reaches an upper limit and communication becomes unavailable.

In the above description, an example in which the device and the gateway perform LoRa communication is shown, but the present disclosure is not limited to this and other communication methods may be used.

Although the present disclosure has been described with reference to the example embodiments, the present disclosure is not limited to the above. The configurations and details of the present disclosure may be modified in various ways that could be understood by those skilled in the art within the scope of the disclosure.

This application claims priority on the basis of Japanese Patent Application No. 2019-095048, filed May 21, 2019, the entire disclosure of which is incorporated herein by reference.

REFERENCE SIGNS LIST 10, 10A, 10B, 10C, 10D, 10E, 10x, 10y GATEWAY
11 DATA TRANSMISSION/RECEPTION UNIT
12 CONNECTIVITY CONFIRMATION UNIT
13 DATA TRANSFER UNIT
14 HOPPING COMMUNICATION UNIT
20 NETWORK SERVER
21 DATA RECEPTION UNIT
22 CONNECTIVITY CONFIRMATION RECEPTION UNIT
23 HOPPING RULE DISTRIBUTION UNIT
30, 30A, 30B, 30C BASE STATION
40 NETWORK
50, 50A, 50B LoRa DEVICE
100 COMMUNICATION SYSTEM

What is claimed is:

1. A communication system comprising:
a plurality of gateways configured to receive device data transmitted from devices and transmit the device data to a network server via a network; and
the network server configured to receive the device data transmitted from the gateways via the network, wherein
each of the gateways comprises:
  connectivity confirmation unit configured to confirm connectivity with another gateway and transmitting a connectivity confirmation result to the network server;
  data transfer unit configured to transfer the device data to an unspecified gateway as transfer data when a failure occurs in communication with a base station the corresponding gateway camps on; and
  hopping communication unit configured to execute processing on the transfer data transferred from another gateway based on a hopping rule,
the network server comprises:
  connectivity confirmation result reception unit configured to receive the connectivity confirmation results from the gateways; and hopping rule distribution unit configured to generate the hopping rule from the connectivity confirmation results based on a criterion for giving a priority to a transfer from the gateway camping on a base station different from the base station on which the corresponding gateway camps and then distributing the generated hoping rule to the gateways.

2. The communication system according to claim 1, wherein
the hopping rule distribution unit generates the hopping rule from the connectivity confirmation results based on a criterion for giving a priority to communication from the gateway camping on the base station different from the base station on which the corresponding gateway camps and including highest received radio wave intensity and then distributes the hopping rule to the gateways.

3. The communication system according to claim 1, wherein
the connectivity confirmation result includes information about a transmission source, a transmission destination, and radio wave intensity.

4. The communication system according to claim 1, wherein
the hopping communication unit performs processing of discarding the transfer data or transmitting the transfer data to the base station based on the hopping rule and a hopping number described in a header of the device data.

5. The communication system according to claim 1, wherein
the gateway communicates with the device by a LoRa method.

6. The communication system according to claim 1, wherein
the data transfer unit transfers the device data by the LoRa method.

7. A method of communication between gateways and a network server via a network, the method comprising:
performing, by each gateway, connectivity confirmation with another gateway and transmitting a connectivity confirmation result to the network server;
generating, by the network server, hopping rule for defining processing on transfer data in the gateways from the connectivity confirmation results based on a criterion for giving a priority to communication from the gateway camping on a base station different from a base station the corresponding gateway camps on and then distributing the hopping rule to the gateways;
transferring, by each gateway, device data received from a device to an unspecified gateway as the transfer data when a failure occurs in communication with the base station the corresponding gateway camps on; and
performing, by each gateway, processing on the transfer data transmitted from another gateway in accordance with the hopping rule.

8. The method according to claim 7, wherein
the network server generates the hopping rule based on a criterion for giving a priority to communication from the gateway camping on the base station different from the base station the corresponding gateway camps on and including highest received radio wave intensity.

9. A server for generating hopping rule for a plurality of gateways receiving device data transmitted from devices and transmitting the device data to a network server via a network, the server comprising:
connectivity confirmation result reception unit configured to receive, from each gateway, a result of confirming connectivity with another gateway; and
hopping rule distribution unit configured to generate the hopping rule from the connectivity confirmation results based on a criterion for giving a priority to a transfer from the gateway camping on a base station different from a base station the corresponding gateway camps on and distributing the generated hopping rule to the gateways.

10. The server according to claim 9, wherein
the hopping rule distribution unit generates the hopping rule based on a criterion for giving a priority to communication from the gateway camping on the base station different from the base station the corresponding gateway camps on and including highest received radio wave intensity.

* * * * *